(12) United States Patent
Kliman et al.

(10) Patent No.: US 6,578,251 B2
(45) Date of Patent: Jun. 17, 2003

(54) METHOD OF FABRICATION OF AN INDUCTION MOTOR DRIVEN SEAL-LESS PUMP

(75) Inventors: Gerald Burt Kliman, Niskayuna, NY (US); Roger Neal Johnson, Hagaman, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/842,420

(22) Filed: Apr. 27, 2001

(65) Prior Publication Data

US 2001/0030475 A1 Oct. 18, 2001

Related U.S. Application Data

(62) Division of application No. 09/347,539, filed on Jul. 6, 1999, now Pat. No. 6,274,962, which is a division of application No. 08/766,683, filed on Dec. 13, 1996, now Pat. No. 5,990,588.

(51) Int. Cl.[7] .................. H02K 15/10; H02K 15/02
(52) U.S. Cl. .................. 29/596; 29/598; 29/888.02; 264/122; 264/126; 264/DIG. 58
(58) Field of Search .................. 29/596, 598, 888.02; 264/DIG. 58, 122, 126, 272.19; 310/156.01, 156.23, 216, 86, 42–45; 417/423.1, 423.7, 410.1

(56) References Cited

U.S. PATENT DOCUMENTS

| | | |
|---|---|---|
| 1,396,033 A | 11/1921 | Francis |
| 1,722,284 A | 7/1929 | Fisher |
| 1,994,534 A | 3/1935 | Robinson |
| 2,126,385 A | 8/1938 | Harbordt |
| 2,128,544 A * | 8/1938 | Surjaninoff .................. 310/86 |
| 2,153,563 A | 4/1939 | Hubacker |
| 2,310,422 A | 2/1943 | Gold |
| 2,387,073 A | 10/1945 | Horlacher |
| 2,506,629 A | 5/1950 | Bilde et al. |
| 2,654,848 A | 10/1953 | Schaefer |
| 2,657,322 A | 10/1953 | Holst |
| 2,768,315 A | 10/1956 | Okabe |
| 3,068,371 A | 12/1962 | Galtz |
| 3,212,170 A | 10/1965 | Marshall |
| 3,443,136 A | 5/1969 | Freeman et al. |
| 3,728,786 A | 4/1973 | Lucas et al. |
| 3,808,135 A | 4/1974 | Weigel et al. |
| 3,848,331 A * | 11/1974 | Pavlik et al. .................. 29/596 |
| 3,872,334 A | 3/1975 | Loubier |
| 4,325,757 A | 4/1982 | Jandeska, Jr. et al. |
| 4,625,135 A | 11/1986 | Kasabian |
| 4,777,396 A | 10/1988 | Ito et al. |

(List continued on next page.)

FOREIGN PATENT DOCUMENTS

| | | | |
|---|---|---|---|
| JP | 57-40339 | 3/1982 | |
| JP | 61-42249 | 3/1982 | |
| JP | 5-121220 | * 5/1993 | .................. 264/122 |

*Primary Examiner*—A. Dexter Tugbang

(57) ABSTRACT

A method of fabricating a motor-pump combination with the motor including a stator including a plurality of teeth extending between opposite stator end faces and a plurality of tooth tips defining a generally axial bore, the method including: forming a magnetic portion of a generally annular sleeve by compression molding a plurality of axially extending ferromagnetic strips using a plastic binder; forming a non magnetic portion of the annular sleeve by injection molding plastic material between adjacent ferromagnetic strips; molding a resin material casing member for the pump with the casing member having a generally annular cylindrical section and including the annular sleeve in part in the annular cylindrical section; and inserting the annular cylindrical section into the bore of the stator and aligning the ferromagnetic strips of the annular sleeve in abutting engagement with the tooth tips on the teeth of the stator.

10 Claims, 5 Drawing Sheets

U.S. PATENT DOCUMENTS

| | | |
|---|---|---|
| 4,879,055 A | 11/1989 | Sezaki et al. |
| 4,942,322 A | 7/1990 | Raybould et al. |
| 4,943,319 A | 7/1990 | Yanagawa et al. |
| 4,947,065 A | 8/1990 | Ward et al. |
| 5,004,577 A | 4/1991 | Ward |
| 5,015,982 A | 5/1991 | Skinner et al. |
| 5,110,687 A | 5/1992 | Abe et al. |
| 5,117,128 A | 5/1992 | Trian |
| 5,121,021 A | 6/1992 | Ward |
| 5,210,493 A | 5/1993 | Schroeder et al. |
| 5,211,896 A | 5/1993 | Ward et al. |
| 5,221,503 A * | 6/1993 | Ward et al. ............ 264/126 X |
| 5,304,877 A | 4/1994 | Baek |
| 5,488,260 A * | 1/1996 | Heyraud .................. 29/598 X |
| 5,500,994 A | 3/1996 | Itaya |
| 5,565,966 A | 10/1996 | Ochiai et al. |
| 5,680,692 A | 10/1997 | Kliman et al. |

* cited by examiner

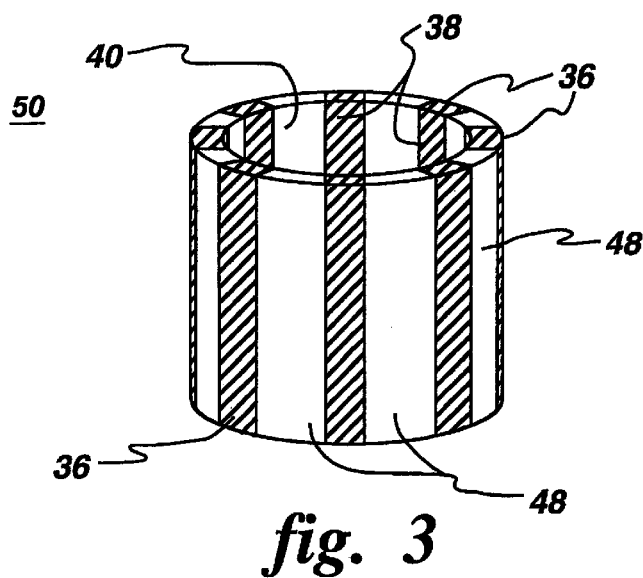
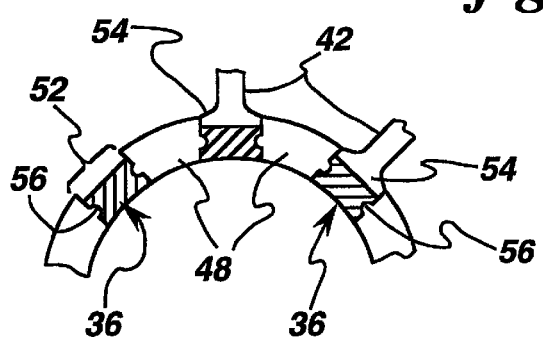 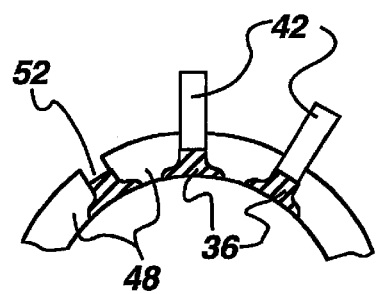
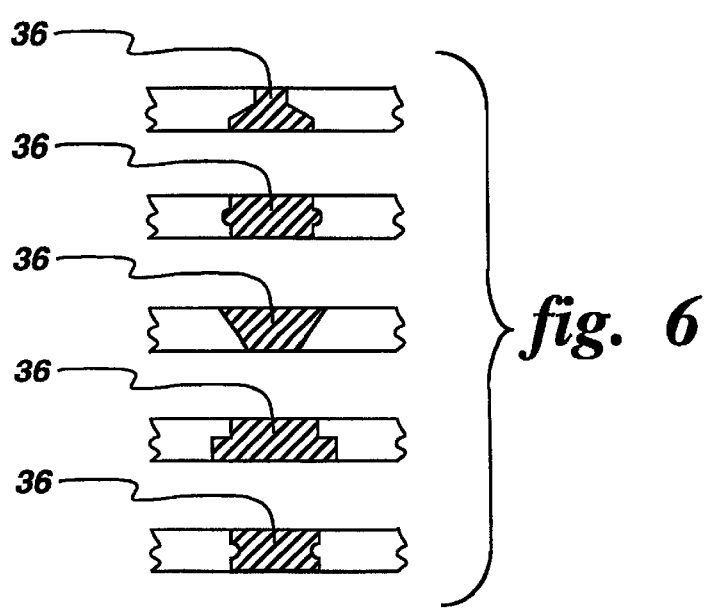

METHOD OF FABRICATION OF AN INDUCTION MOTOR DRIVEN SEAL-LESS PUMP

This application is a division of application Ser. No. 09/347,539 filed Jul. 6, 1999 now U.S. Pat. No. 6,274,962, which is a division of Ser. No. 08/766,683 filed Dec. 13, 1996 issued as U.S. Pat. No. 5,990,588 on Nov. 23, 1999, which is hereby incorporated by reference in its entirety.

BACKGROUND OF THE INVENTION

This invention relates to electric motor driven fluid handling assemblies and, more particularly, to a seal-less pump and motor assembly having improved electrical characteristics.

There are various applications in which a mechanical apparatus may be exposed or immersed in a fluid and adapted for being driven by an electric motor. Typical examples are a water pump in a dishwasher or clothes washing machine and an agitator in a clothes washing machine. In such applications, it is desirable to isolate the electric motor from the water both to protect the motor and to prevent electric shock hazards. A classic method of isolating the electric motor is to extend a shaft from the mechanical apparatus through a seal to the motor. The shaft to seal interface must provide for relative shaft motion and therefore is subject to wear and deterioration leading to fluid leaks at the interface.

An alternative strategy which avoids the potential seal leakage is to place the motor into the fluid environment. However, this strategy is inadvisable for water pumps and can be expensive when the electrical connections of the motor must be fluid proof.

Another method which avoids the seal leakage problem is to construct the apparatus, e.g., a pump, within a housing which also encompasses the motor rotor. The housing closely envelopes the circumference of the rotor without contact. The motor stator is then positioned outside the housing about the rotor. With a typical plastic housing, this arrangement requires a relatively large space between the rotor and stator, i.e., the effective "air gap" may be as much as 10 times the normal motor gap for an induction motor. For example, a minimum thickness for a plastic housing is generally about 0.09 inches while a nominal air gap for an efficient induction motor is about 0.01 inch. The resulting construction produces a motor which is oversized, expensive and inefficient with poor operating characteristics.

Still another prior art attempt to resolve the electric motor/pump problem of isolating the motor from the pumped fluid is to use a permanent magnet motor. Such a motor is expensive due to both the magnet cost and fabrication costs to meet water resistant constraints. Further, simple single phase permanent magnet synchronous motors are sometimes used for this purpose and are difficult to start in a controlled direction and have synchronization problems. If an electronically commutated control is used, the motor and drive cost increases dramatically.

Another challenge when designing a seal-less pump is that, even in relatively clean water, the wet rotor of a seal-less pump is subject to corrosion because of the presence of dissolved oxygen. A conventional technique for resisting corrosion is to coat the rotor with a material such as a plastic or an epoxy or to plate the rotor with a corrosion resistant metal such as aluminum. Crevices between rotor laminations and/or between rotor laminations and the rotor cage cause effective sealing to be difficult, and the coatings sometimes fail after a number of immersions.

To avoid the crevices, a solid iron rotor can be used. Sheet rotors comprising a copper shell brazed to a solid steel core are used in X-ray tube target rotators to withstand high temperatures, high speed, and vacuum conditions. Such rotors are typically coated with infra-red emitters.

Solid iron and steel cores can become corroded, and skin effects can affect electromagnetic steady state performance in the solid cores even at low slip frequencies. These skin effects can lead to difficulties in starting the rotor.

SUMMARY OF THE INVENTION

Among the several objects of the present invention may be noted the provision of an induction motor driven fluid handling apparatus which eliminates the necessity of a seal at any rotating interface; the provision of an induction motor driven fluid handling apparatus in which the motor rotor is encompassed by an apparatus housing while the motor air gap is maintained at a nominal value; the provision of an induction motor driven fluid handling apparatus which overcomes the size, inefficiency and poor operating characteristics of prior seal-less motors; the provision of a method for construction of an induction motor driven seal-less pump; and the provision of an economical method of making a corrosion resistant induction motor rotor that will have a good electromagnetic performance.

Briefly, in one embodiment a seal-less pump and electric motor assembly includes a motor rotor fixed to a driving shaft connected to an impeller in the pump assembly. The motor rotor and impeller are enclosed in a common housing such that the rotor rotates within any fluid being pumped by the impeller. The portion of the housing circumscribing the motor rotor includes a plurality of axially extending, circumferentially spaced strips of magnetic material penetrating through the insulative plastic material of the housing. Each of the strips coincide with corresponding ones of the pole teeth of a motor stator circumscribing the outer portion of the housing such that the strips in the housing act as extensions of the pole teeth.

In another embodiment, a rotor of a seal-less pump comprises a rotor shaft, a rotor core including a molded magnetic powder and plastic composite material surrounding the rotor shaft, and an annular corrosion resistant electrically conductive tube surrounding the rotor core.

BRIEF DESCRIPTION OF THE DRAWINGS

For a better understanding of the present invention, reference may be had to the following detailed description taken in conjunction with the accompanying drawings in which:

FIG. 3 is a perspective view of a pump enclosure segment according to the present invention;

FIGS. 4 and 5 are enlarged sectional views of sections of the enclosure segment of FIG. 3 showing alternate forms of magnetic strips and pole teeth extensions.

FIGS. 6, 6A, 6B, 6C, 6D, and 6E illustrate still other cross-sectional shapes for the magnetic strips and pole teeth extensions;

DETAILED DESCRIPTION OF THE INVENTION

Figure 1:
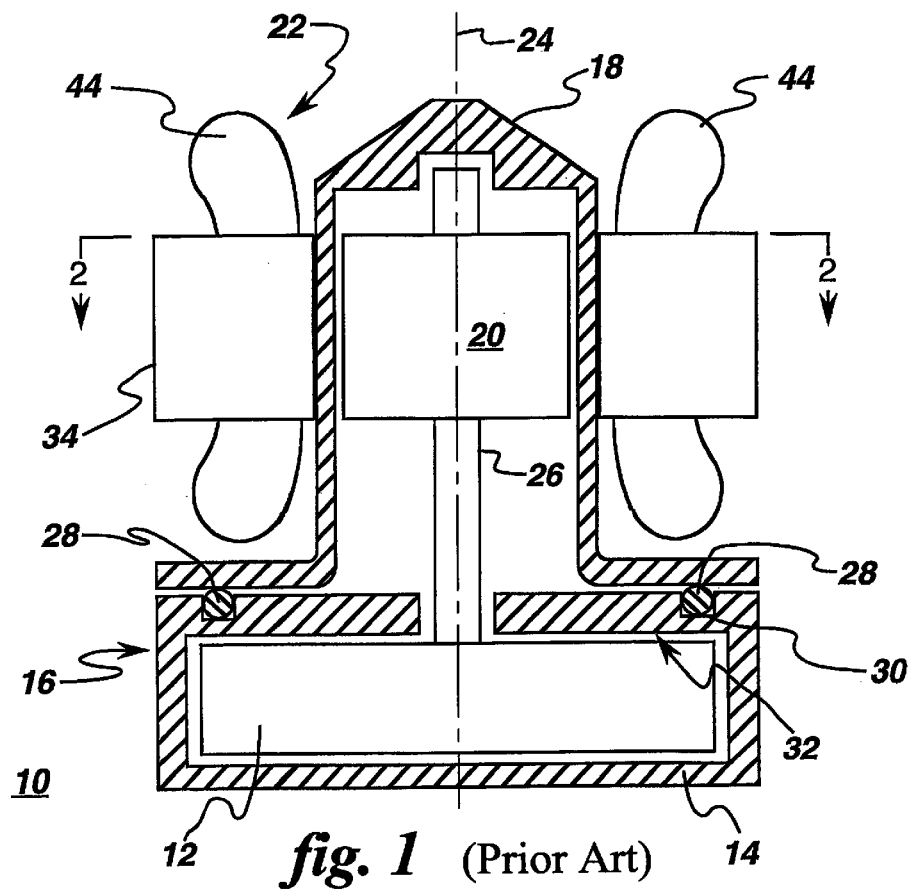
FIG. 1 is a simplified cross-sectional view of a prior art seal-less pump and electric motor assembly.

FIG. 1 is a simplified cross-sectional view of a prior art seal-less pump/induction motor assembly of the type with which the present invention may be used. The pump 10 comprises an impeller 12 positioned in an enclosure 14 forming a portion of a pump housing 16. Another enclosure 18 forms another portion of housing 16 and encompasses a rotor 20 of an alternating current (AC) induction motor 22. The housing 16 is circular about an axis 24 through the motor rotor 20 and impeller 12. A shaft 26 of rotor 20 lies on axis 24 and connects to impeller 12 so that rotation of rotor 20 drives impeller 12. An O-ring 28 positioned in an annular groove 30 in a wall 32 of enclosure 14 provides a watertight seal between enclosure 14 and enclosure 18. Enclosure 18 may be attached to enclosure 14 by threaded fasteners, clamps or other means well known in the art. For simplicity, neither the enclosure-to-enclosure attachment means nor the pump inlet and outlet lines are shown. Further, the bearing assemblies which support shaft 26 for rotation are omitted.

The motor 22 includes a stator 34 positioned outside enclosure 18 circumscribing rotor 20. Pole faces of stator 34 are desirably abutting the outer surface of enclosure 18 in order to reduce the gap between the pole faces and the outer surface of rotor 20. However, the minimum thickness of enclosure 18 is limited to about 3/32 inch in order to provide sufficient strength and stiffness of the enclosure. For good performance and efficiency and reasonable size, the desired air gap, i.e., the spacing between the stator pole teeth faces and the rotor outer surface should be about 1/100 inch. Thus, the plastic enclosure 18 results in a stator-rotor gap which is about 10 times the desired gap and detrimentally affects motor size, performance and efficiency. Obviously, the stator 34 operates in open air while rotor 20 is submerged in whatever fluid, e.g., water, is being pumped.

Figure 2:
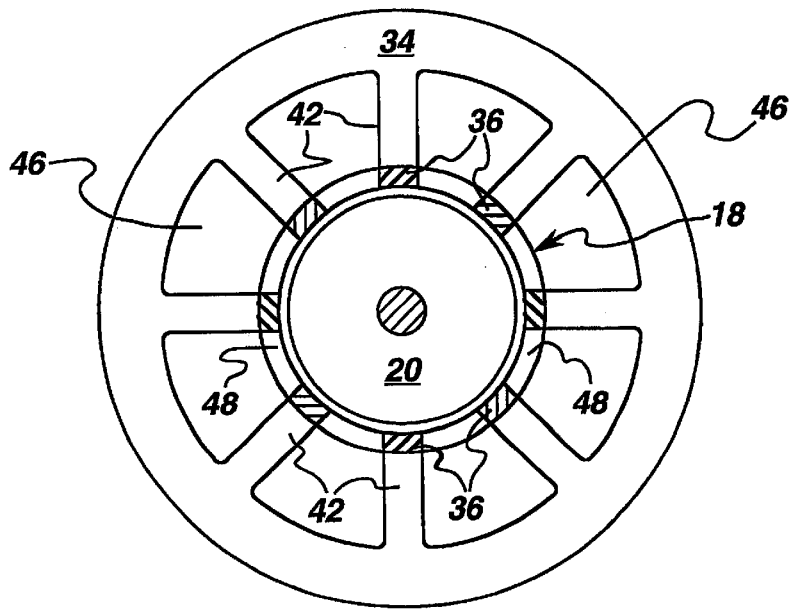
FIG. 2 is a simplified cross-sectional view of a seal-less pump/induction motor assembly incorporating the present invention.

Turning to FIG. 2, there is shown a cross-sectional view taken along the line 2—2 of FIG. 1, illustrating an improved electric motor driven pump assembly in accordance with the present invention. The elements of FIG. 1 remain unchanged, the invention lying in the construction of enclosure 18. Considering FIG. 2 in combination with FIG. 3, it will be seen that the inventive enclosure 18 is constructed with a plurality of circumferentially spaced ferromagnetic strips 36 integrally formed in the plastic material of enclosure 18, i.e., the strips 36 alternate with plastic elements 48. Each of the strips 36 has an inner face 38 coincident with the inner face 40 of enclosure 18 allowing the strips 36 to be closely positioned facing rotor 20, preferably within 1/100 inch. The strips 36 extend through enclosure 18 and are accessible from an outer surface of enclosure 18 allowing direct contact with respective pole teeth members 42 of stator 34. For simplicity, the windings 44 of FIG. 1 are not shown in the pole teeth interstices 46 of FIG. 2. It will be appreciated that various numbers of pole teeth may be used and that there may be multiple pole teeth in each magnetic pole of stator 34. The strips 36 are desirably formed with the same axial length and width as the pole teeth 42.

As shown in FIG. 3, at least a portion of the enclosure 18 may be formed as an annular sleeve comprising a plurality of molded magnetic tooth tips or strips 36 interspersed with conventional plastic strips 48 to form a segmented ring 50. In general, the strips 36 are formed by combining iron powder in a plastic matrix and then either extruding or molding the individual strips 36 from the plastic into a shape to match the width and length of a stator tooth with which the ring is to be used. Once the strips 36 have been formed, these strips can then be set into a die or mold that will be used to make the injection molded pump shell or enclosure 18 and molded in place with the remainder of the enclosure 18. The sizing of the segmented ring 50 is selected so that when the motor stator is slid over the enclosure 18, there is a tight fit between each of the strips 36 and a corresponding one of the pole tooth members 42. In effect, the strips 36 become extensions of the pole teeth 42. In this way, the magnetic gap is reduced to that of only the spacing between the outer surface of the rotor 20 and the inner surface of the enclosure 18. Such spacing may be only that gap required to provide a mechanical clearance between the enclosure 18 plus a few mils for stator fit mismatch. Thus, the motor 22 may be of conventional design and size except for a small extra tooth leakage flux and a slightly larger effective gap between the ends of the stator teeth and the outer surface of the rotor 20. It is expected that the powdered iron in the plastic or epoxy matrix will have a lower permeability and higher losses than a steel lamination, but since the volume of the powdered iron matrix is relatively small, the effect will not be of major significance in overall motor performance. A typical powdered iron material useful in forming the strips 36 of the present invention is available from the Hoeganaes Corporation in the form of an atomized iron powder, similar to that used in sintered powder metallurgy production, but with each particle of iron powder coated with a layer of ULTEM™ polyetherimide (ULTEM is a registered trademark of the General Electric Company).

Referring now to FIGS. 4 and 5, there is shown enlarged cross-sectional views of a portion of the enclosure 18 with two different forms of the strips 36. In both FIGS. 4 and 5, the enclosure 18 is molded with the strips 36 having a different radial thickness than the adjacent plastic sections between the strips. Accordingly, the enclosure 18 appears to have a plurality of grooves 52 overlying each of the strips 36. The grooves facilitate accurate matching of the stator to the magnetic strips by forcing the stator teeth into the grooves between the plastic elements and onto the ferromagnetic strips 36. During the assembly process, the grooves enable the stator to be guided into the proper position without any special tooling. For conventional motor stators having a broad or widened tooth tip 54, the arrangement shown in FIG. 4 may be preferred in which the broadened tooth tips simply mate with a wide strip 36. The strips 36 then merely create an extra thick tooth tip. This arrangement results in some additional leakage flux with a penalty in the pullout torque generated by the motor but still provides significant advantages over the prior art. An alternative is to fabricate the stator teeth with straight segments as shown in FIG. 5 and to form the strips 36 in a conventional tooth tip configuration. This arrangement improves the leakage flux problem and further improves pullout torque but does require a redesign of the stator laminations to produce the stator teeth without the conventional tooth tip 54.

It will also be noted in FIG. 4 that the strips 36 are formed with grooves 56 along opposite sides. These grooves 56 may be useful in providing a better binding of the strips 36 to the adjacent plastic sections 48 of the enclosure 18. FIG. 6 illustrates some additional shapes which may be useful in forming the strips 36. These additional shapes may be useful in providing improved sealing, simplifying manufacturing or merely to give greater strength to the outer shell of enclosure 18.

FIGS. 6A, 6B, 6C, 6D, and 6E illustrate other shapes of the pole teeth extensions and strips 36. The radial shape of a magnetic strip affects the flux pattern in the magnetic strip and can provide various physical features to enhance the fabrication process. The shape of a strip can be used to aid the flux transition from a high permeability steel to a lower permeability magnetic strip and to reduce volume occupied by a magnetic strip. Cost of a magnetic strip is proportional to density. It can be cost effective therefore to reduce the density of a magnetic strip while permitting an acceptable level of magnetic losses. The required magnetic strip density can be decreased by reducing the flux density and total flux passing through the magnetic strip.

Figure 6A:
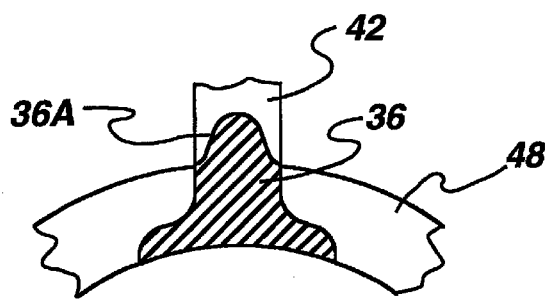

FIG. 6A encourages alignment of the stator pole teeth members 42 with strips 36 by forming each strip 36 with a radially outward extending portion 36A. Pole teeth members 42, preferably formed of punched and stacked laminations, are designed with an end shaped with a depression to fit about and abut against strips 36. The height of the portion 36A above the outer surface of the rotor shell 48 is about 0.057 inches for a sleeve or shell 48 thickness of about 0.081 inches. This embodiment is useful for alignment but requires more magnetic strip material and promotes a higher flux density in the transition region.

Figure 6B:
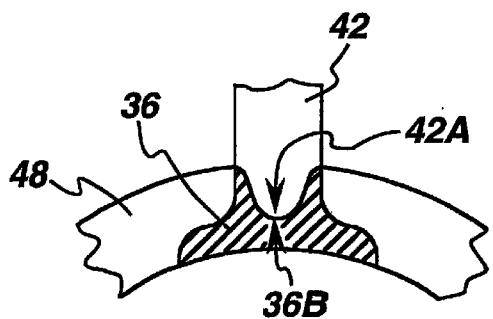

FIG. 6B is a reversal of FIG. 6A in which the pole teeth members 42 are formed with a rounded protuberance 42A which fits into and engages a shaped depression 36B in strip 36. This embodiment aids alignment, reduces the amount of strip material required, and promotes a lower flux density in the transition region of the magnetic strip.

Two potential challenges to fabrication of the seal-less pump are interference of stator winding endturn bundles (not shown) with segmented ring 50 (and pump/rotor housing 18) and difficulty in holding the stator windings in the stator slots prior to assembly with the pump/rotor housing.

Figure 6C:
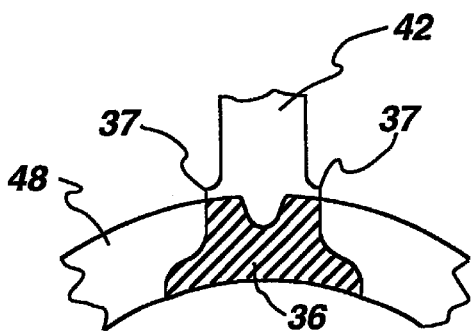

FIG. 6C is a view of a stator tooth having vestigial tips 37 which protrude into the stator slot to help hold in place any slot insulator and/or slot wedge. Depending upon the size of the vestigials, the vestigials can also be useful for holding the slot windings in position. Having depressions in strip 36 and protuberances in teeth member 42, as shown in FIGS. 6B–6E, provides an increase in the minimum diameters that the endturn bundles can occupy towards the bore.

Figure 6D:
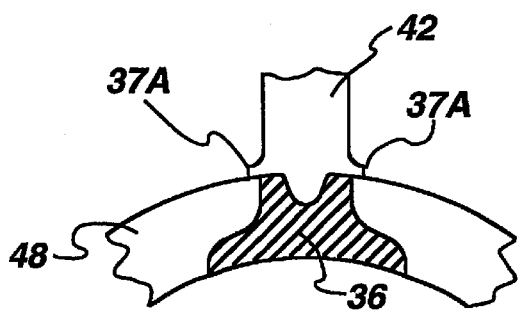
Figure 6E:
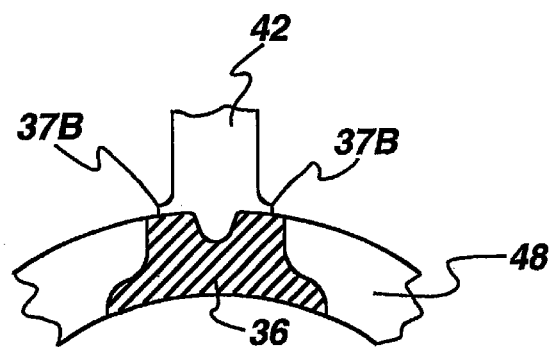

FIGS. 6D and 6E illustrate alternative positions for the vestigial tips where the edges of the vestigial tips are not aligned with the magnetic strip. In FIG. 6D, vestigial tips 37a are wider than the magnetic strip edge, and in FIG. 6E, vestigial tips 37b are narrower than the magnetic strip edge.

Figure 7:
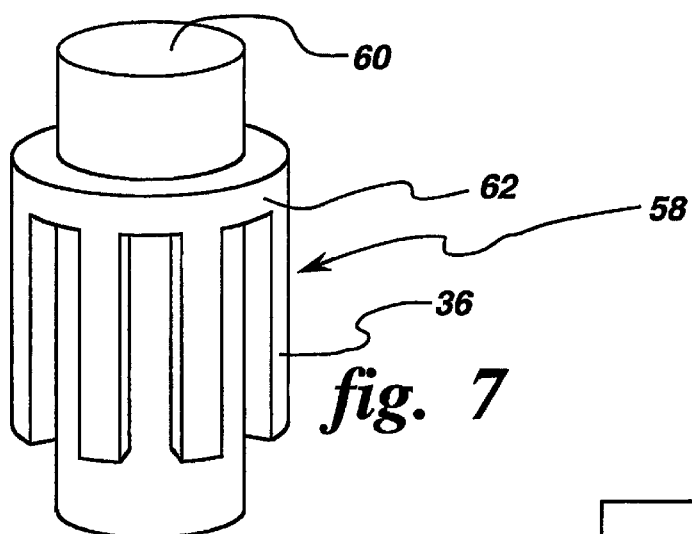
FIGS. 7 and 8 illustrate manufacturing steps for producing the inventive housing segment.
Figure 8:
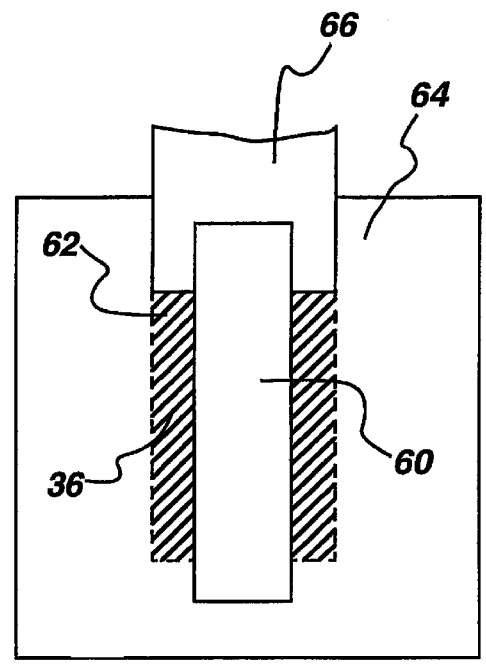

FIGS. 7 and 8 illustrate other possible intermediate stages of fabrication of an enclosure 18 in accordance with the present invention. In FIG. 7, the magnetic portion of a segmented ring 58 is positioned on a mandrel 60. The segmented ring 58 comprises a plurality of powdered iron and plastic composite tooth tips or strips 36 which can be bonded together by plastic strips 48 molded in between as shown in FIG. 3. The segmented ring 58 is initially formed on the mandrel 60 in a compression molding operation as shown in FIG. 8. A small end ring 62 of material is left at one end to assure that the teeth 36 remain in proper alignment. The mandrel 60 is coated with a release compound and has an outer diameter which forms the inner diameter of the segmented ring 58, i.e., it has a diameter equal to the diameter of the motor rotor 20 plus a desired clearance gap, e.g., about 1/100 inch. The mandrel 60 is positioned into a die 64 which has a plurality of slots surrounding the mandrel with each of the slots having the desired length and configuration of a strip 36 to be molded. The powdered iron and plastic matrix, e.g., ULTEM™ polyetherimide, is poured into the die 64 to fill the space around the mandrel 60 and a ram 66 is then brought down into the die 64 to compression form the segmented ring. The die 64 is heated during compression to mold the powdered iron and plastic into a composite part.

After molding, the mandrel 60 with the molded tooth tips or strips 36 attached is then withdrawn from the die 64. The mandrel 60 and tooth tips 36 are then inserted in a second die (not shown). A molten plastic is then injected into the spaces between each of the preformed strips 36 while the strips are in the die so that the spaces between each of the strips is filled with the molten plastic. The temperature and pressure with which the plastic is injected is selected based upon normal production injection molding of parts. The injected plastic will bond with the plastic base of the magnetic strips 36 thus forming a watertight solid enclosure. Preferably, the plastic is filled with glass fiber such that the expansion coefficients of the tooth tips 36 and the intermediate filler are reasonably matched. After molding and removal from the die, the temporary end ring 62 which was used to hold the molded strips 36 together can be severed from the final segmented ring. The enclosure 18 is then completed by positioning the segmented ring 50 (See FIG. 3) into a conventional pump casing mold (not shown) which molds the final entire enclosure 18 in a conventional manner.

While the above described method of producing the segmented ring 50 is a preferred method, an alternate method may be to extrude the ring 50 as a composite ring with both the magnetic strips 36 and the intermediate plastic sections in a single operation. Since the plastic base used in both the strips and the bonding plastic are the same or compatible, they will merge and bond in the process. The tooth tips formed by the extrusion process will be less dense than those formed using the compression molding process and will result in somewhat poorer electromagnetic performance. However, since the tooth tips form a very small part of the total magnetic circuit, it is believed that there will be little difference in overall motor performance between extruded and compression molded tooth tips.

Figure 9:
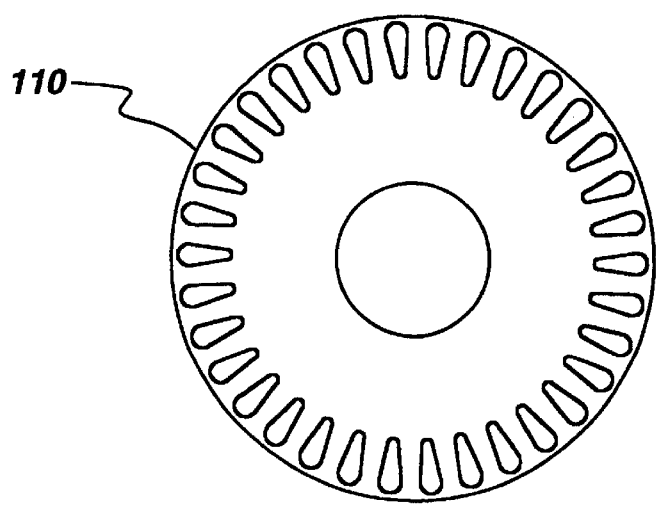
FIG. 9 is a view of a conventional rotor lamination sheet.

FIG. 9 is a view of a conventional rotor lamination sheet 110. Induction motor rotors for small machines are conventionally fabricated by punching thin steel sheets (having thickness ranging from about 0.018 inches to about 0.030 inches) and stacking the sheets to form the rotor core. The holes near the periphery of the rotor core are generally filled with molten aluminum to form the rotor windings. Rings of aluminum are molded onto the ends of the windings to connect the windings together and form a "squirrel cage" winding. Stacking of rotor core sheets (laminations) permits the magnetic flux to fully penetrate the rotor during starting, aides in torque production, and can increase efficiency of the rotor during operation. Rotor stacks are often skewed to minimize slot interaction effects. As discussed in the background above, conventional induction motor rotors are conducive to corrosion when they become wet.

Starting and running performance of a corrosion resistant rotor can be achieved by pressing or shrink fitting an annulus of electrically conductive, corrosion resistant material over a solid steel rotor core. For solid steel rotor cores, there will be skin effects, especially during starting, and corrosion occurs.

Figure 10:
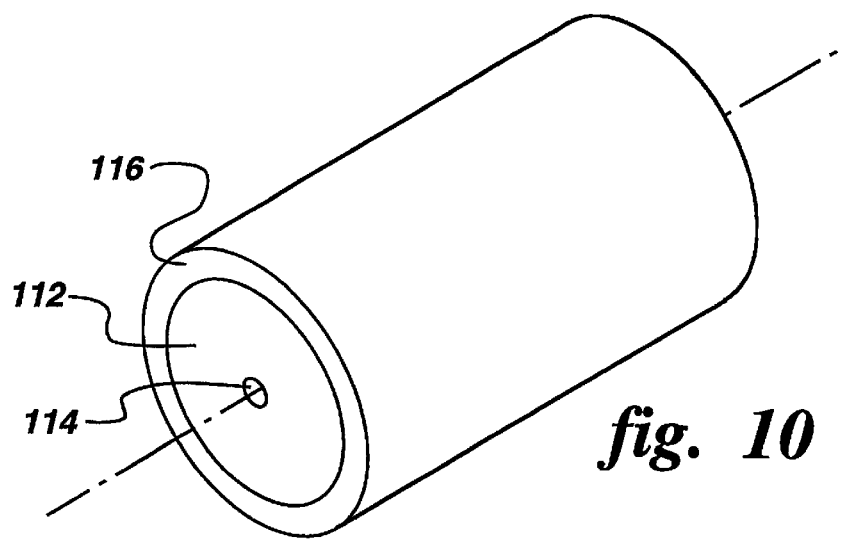
FIG. 10 is a perspective view of a rotor embodiment of the present invention.

FIG. 10 is a perspective view of a rotor embodiment of the present invention. A rotor core 112 comprises a molded magnetic powder/plastic composite material. In one embodiment, irregularly shaped iron particles individually coated with a plastic material such as ULTEM™ polyetherimide are compression molded with a shaft hole. Other examples of appropriate magnetic materials include steel, ferrite (iron oxide), stainless steel, nickel, and cobalt. Other examples of appropriate plastic materials include polymers and epoxies. The rotor fabrication process then is completed by applying a shaft 114 comprising a corrosion resistant material such as stainless steel and an annular tube 116 comprising a corrosion resistant electrically conductive material such as aluminum, brass, or copper. In another embodiment, the core is fabricated by extruding a long rod of material with a central hole and cutting off suitable lengths. This less expensive fabrication process results in some surface corrosion from metal exposed by cutting the end surfaces.

Figure 11:
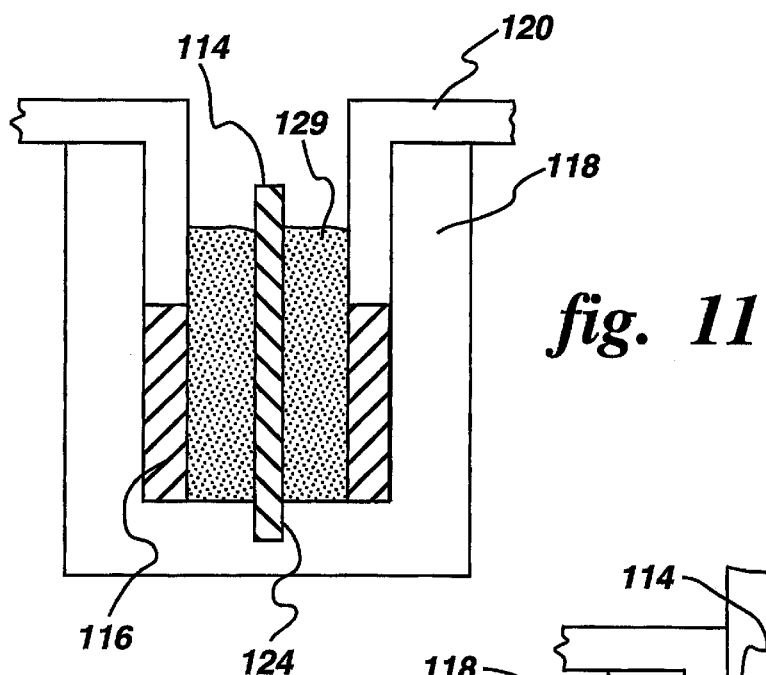
FIGS. 11 and 12 are sectional side views of a fixture for fabricating the rotor of FIG. 10.
Figure 12:
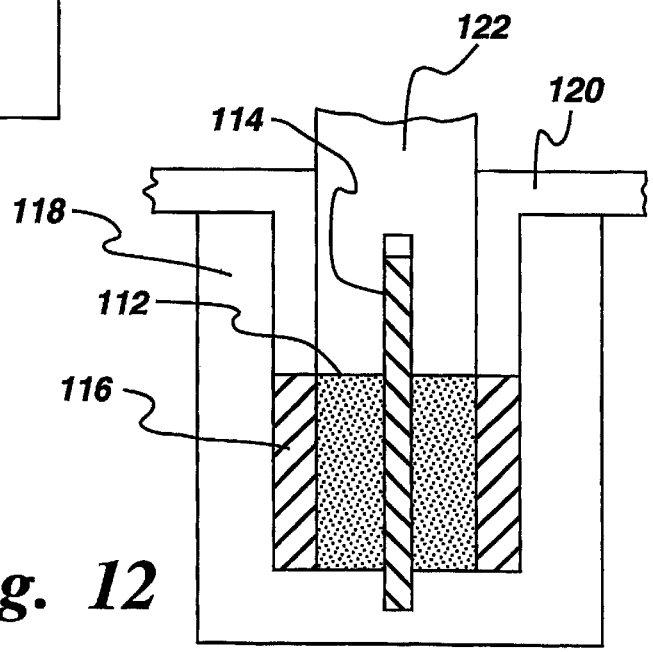

FIGS. 11 and 12 are sectional side views of one embodiment of a fixture 118 for fabricating the rotor of FIG. 10. First, hollow aluminum tube 116 is baked in air to form a hard aluminum oxide coating on all surfaces to resist corrosion. Tube 116 is positioned in a cylindrical die fixture 118. Shaft 114 is also positioned in the fixture. The fixture, tube, and shaft are then preheated to a predetermined molding temperature, and the coated iron particles 129 are preheated and poured into the fixture. It is useful to have a mold piece 120 adjacent tube 116 and fixture 118 to better guide particles 112a between the tube and the shaft and to prevent distortion of the tube 116. It is also useful to have a notch 124 in fixture 118 for supporting the rotor shaft.

The poured volume of particles should be greater than the finished rotor core size to allow for compression. A ram 122 can be brought down with a suitable force to compress the volume of particles, and raising the temperature will cause the particles to bond together and form a solid mass 112. After a cooling period, the finished rotor can be removed from the die. Whether preheating and/or cooling is necessary is dependent on the plastic material coating the iron particles.

The rotor of the present invention is expected to have good flux penetration and low losses in running. The molding process will leave a film of bonding material on the surface of the rotor which will provide an additional barrier to the individual particle coats, and a close bond between the core and the tube will prevent the entry of moisture into the core.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A method of fabricating a motor-pump combination with the motor thereof comprising a stator, the stator comprising a pair of opposite end faces, a plurality of teeth extending between the opposite end faces, and a plurality of tooth tips on the teeth defining in part a generally axial bore between the opposite end faces, the method comprising:

(a) forming a magnetic portion of a generally annular sleeve by compression molding a plurality of axially extending ferromagnetic strips using a plastic binder;

(b) forming a non magnetic portion of the annular sleeve by injection molding plastic material between adjacent ferromagnetic strips to form a plurality of resin material strips;

(c) molding a resin material casing member for the pump of the motor-pump combination with the casing member having a generally annular cylindrical section and including the annular sleeve in part in the annular cylindrical section; and (d) inserting the annular cylindrical section into the bore of the stator and aligning the ferromagnetic strips of the annular sleeve in abutting engagement with the tooth tips on the teeth of the stator.

2. The method of claim 1 wherein said step (a) comprises forming axially extending grooves along respective opposed sidewalls of the ferromagnetic strips, and wherein injection molding the plastic material between adjacent ferromagnetic strips includes injection molding the plastic material in the grooves.

3. The method of claim 2 wherein said step (b) includes establishing a plurality of guide slots generally axially across an outer circumference of the annular sleeve with adjacent resin material strips defining opposed sidewalls of each slot and one of the ferromagnetic material strips between the adjacent resin material strips defining a base wall of each guide slot between the opposed sidewalls thereof.

4. The method of claim 3 wherein said step (d) includes slid of the stator into the guide slots in the annular sleeve in guiding relation with the opposed sidewalls of the guide slots, respectively.

5. The method of claim 4 wherein said step (d) further includes abutting the tooth tips with the base wall of the guide slots respectively defined by the ferromagnetic material strips in the annular sleeve.

6. The method of claim 1 wherein compression molding comprises compression molding ferromagnetic strips each having an inner annular sleeve surface which is wider than an outer annular sleeve surface.

7. The method of claim 6 wherein compression molding comprises compression molding ferromagnetic strips each having the outer annular sleeve surface comprise an axially extending rounded portion.

8. A method of fabricating a motor-pump combination with the motor thereof comprising a stator, the stator comprising a pair of opposite end faces, a plurality of teeth extending between the opposite end faces, and a plurality of tooth tips on the teeth defining in part a generally axial bore between the opposite end faces and having axially extending rounded portions, the method comprising:

(a) forming a magnetic portion of a generally annular sleeve by using a plastic binder for compression molding a plurality of axially extending ferromagnetic strips each comprising an inner annular sleeve surface which is wider than an outer annular sleeve surface and includes an axially extending rounded portion corresponding to an axially extending rounded portion of a respective one of the tooth tips;

(b) forming a non magnetic portion of the annular sleeve by injection molding plastic material between adjacent ferromagnetic strips to form a plurality of resin material strips;

(c) molding a resin material casing member for the pump of the motor pump combination with the casing member having a generally annular cylindrical section and including the annular sleeve in part in the annular cylindrical section; and (d) inserting the annular cylindrical section into the bore of the stator and aligning the ferromagnetic strips of the annular sleeve in abutting engagement with the tooth tips on the teeth of the stator.

9. The method of claim 8 wherein said step (b) includes establishing a plurality of guide slots axially across the outer circumference of the annular sleeve with adjacent resin material strips defining opposed sidewalls of each slot and one of the ferromagnetic material strips between the adjacent resin material strips defining a base wall of each guide slot between the opposed sidewalls thereof.

10. The method of claim 8 said step (a) comprises forming axially extending grooves along respective opposed sidewalls of the ferromagnetic strips, and wherein injection molding the plastic material between adjacent ferromagnetic strips includes injection molding the plastic material in the grooves.

* * * * *